United States Patent
Xie

(10) Patent No.: US 9,603,183 B2
(45) Date of Patent: Mar. 21, 2017

(54) METHOD AND SYSTEM FOR KEEPING SINGLE RADIO VOICE CALL CONTINUITY SESSION ALIVE

(75) Inventor: Zhenhua Xie, Shenzhen (CN)

(73) Assignee: ZTE Corporation (CN)

( * ) Notice: Subject to any disclaimer, the term of this patent is extended or adjusted under 35 U.S.C. 154(b) by 740 days.

(21) Appl. No.: 13/639,192

(22) PCT Filed: Mar. 31, 2011

(86) PCT No.: PCT/CN2011/072347
§ 371 (c)(1),
(2), (4) Date: Oct. 4, 2012

(87) PCT Pub. No.: WO2011/127790
PCT Pub. Date: Oct. 20, 2011

(65) Prior Publication Data
US 2013/0028195 A1 Jan. 31, 2013

(30) Foreign Application Priority Data
Apr. 13, 2010 (CN) .......................... 2010 1 0146449

(51) Int. Cl.
*H04L 29/08* (2006.01)
*H04W 36/22* (2009.01)
(Continued)

(52) U.S. Cl.
CPC ......... *H04W 76/045* (2013.01); *H04L 67/145* (2013.01); *H04W 36/0022* (2013.01)

(58) Field of Classification Search
CPC ............. H04W 36/0022; H04W 36/14; H04W 36/385; H04W 72/00; H04W 76/02;
(Continued)

(56) References Cited

U.S. PATENT DOCUMENTS

| 8,180,347 B2 | 5/2012 | You et al. |
| 8,467,786 B2 * | 6/2013 | Salkintzis ............. H04W 48/20 455/434 |

(Continued)

FOREIGN PATENT DOCUMENTS

| CN | 101227677 | 7/2008 |
| CN | 101291454 | 10/2008 |
| CN | 101459939 | 6/2009 |

OTHER PUBLICATIONS

International Search Report for PCT/CN2011/072347, English translation attached to original, Both completed by the Chinese Patent Office on Jun. 9, 2011, All together 6 Pages.
(Continued)

*Primary Examiner* — Ayaz Sheikh
*Assistant Examiner* — Debebe Asefa
(74) *Attorney, Agent, or Firm* — Brooks Kushman P.C.

(57) ABSTRACT

A method and system are provided for keeping a single radio voice call continuity session alive. The method comprises, during switching of a terminal from a packet switch domain to a circuit switch domain, an application layer gateway establishing a new signaling connection with an enhanced mobile switch center after receiving a first transfer request and notifying a service centralization and continuity application server (SCC AS) to establish a new signaling connection with the application layer gateway, and the SCC AS establishing a new signaling connection with the application layer gateway according to the notification. Using the technical scheme of the method and system provided, the problem of call interruption due to a UE being unable to perform IMS re-registration in a destination domain in a single radio voice call continuity process in the prior art is solved.

10 Claims, 3 Drawing Sheets

(51) Int. Cl.
*H04W 76/04* (2009.01)
*H04W 36/00* (2009.01)

(58) Field of Classification Search
CPC ............... H04W 88/16; H04W 76/045; H04L 29/06217; H04L 29/06265; H04L 29/06285; H04L 29/06326; H04L 67/145
See application file for complete search history.

(56) References Cited

U.S. PATENT DOCUMENTS 8,730,917 B2 * 5/2014 Xie .................. H04W 36/0022
370/225
2008/0089325 A1 4/2008 Sung

OTHER PUBLICATIONS

Extended European Search Report for PCT/CN2011/072347, Completed by the European Patent Office, Dated Mar. 25, 2014, 4 Pages.
3GPP TR 23.856, Mar. 22, 2010, 52 Pages, "3rd Generation Partnership Project; Technical Specification Group Services and System Aspects; Single Radio Voice Call Continuity (SRVCC) enhancements; Stage 2 (Release 10)".
3GPP TS 23.237, Mar. 17, 2011, 156 Pages, "3rd Generation Partnership Project; Technical Specification Group Services and System Aspects; IP Multimedia Subsystem (IMS) Service Continuity; Stage 2 (Release 11)".

* cited by examiner

METHOD AND SYSTEM FOR KEEPING SINGLE RADIO VOICE CALL CONTINUITY SESSION ALIVE

CROSS-REFERENCE TO RELATED APPLICATION

This application is the U.S. national phase of PCT Appln. No. PCT/CN2011/072347 filed Mar. 31, 2011 which claims priority to Chinese Application No. 201010146449.0 filed Apr. 13, 2010, the disclosures of which are incorporated in their entirety by reference herein.

TECHNICAL FIELD

The present invention relates to the field of communications, and more particularly, to a method for keeping a single radio voice call continuity session alive in an Internet Protocol (IP for short) Multimedia Subsystem.

BACKGROUND OF THE RELATED ART

IP Multimedia Core Network Subsystem (IMS), which is the IP-based network architecture proposed by the Third Generation Partnership Project (3GPP for short), constructs an open and flexible service environment, supports multimedia applications, and is able to provide users with enriched multimedia services.

In the IMS service system, the control layer and the service layer are separated. The control layer does not provide specific services, but only provides necessary triggering, routing, billing and other functions to the service layer.

The service trigger and control functions in the control layer are accomplished by a call session control function (CSCF for short). The call session control function is divided into an proxy call session control function (Proxy-CSCF, P-CSCF for short), an interrogating call session control function (Interrogating-CSCF, I-CSCF for short) and a serving call session control function (Serving-CSCF, S-CSCF for short), among which the S-CSCF has the main responsibility, and the I-CSCF is optional.

The service layer consists of a series of application servers (AS for short), and is able to provide specific business services. The ASs might be standalone entities or reside in the S-CSCF.

The control layer (S-CSCF) controls service triggering according to user subscription information, invokes services in the ASs, and achieves service functions. Both the ASs and the S-CSCF can be collectively referred to as server equipment (SE for short).

Application layer gateways (ALG, including signaling processing entities and media processing entities) also exist in the IMS network to achieve interaction of control signaling and media between different networks. A session media path passing a ALG is divided into two sections, one being a intra-network media path, that is, a media path between the ALG and a terminal of a session which is in the same network as the ALG, the other being a inter-network media path, that is, a media path between the ALG and another terminal of the session.

End-to-end devices in the session are called as user equipment (UE for short) and are responsible for interacting with users. Some UEs use various network access modes, such as by a packet switch (PS for short) domain access network of 3GPP, by a PS domain access network of other non-3GPP, or even by a circuit switch (CS for short) domain access network, etc.

If an enhanced mobile switch center (eMSC for short) is configured in the CS network and provides a SIP (Session Initial Protocol) interface to interact with the IMS network, then the interaction between the IMS network and the CS network can be achieved by the eMSC.

For a UE with a variety of access modes, if the UE can use only one access mode at a time, when it is executing a certain service, such as a call, in one access mode, when the UE moves to other places and needs to change its used access mode, the UE and the network can provide a certain mode such that the service which is being executed by the UE will not interrupted. Such capability is called as single terminal radio voice call continuity, single radio voice call continuity (SRVCC) for short.

FIG. 1 is a flow chart of an existing method for implementing single radio voice call continuity, in which an IMS session between a UE-1 and a UE-2 is established, session signaling passes through an ALG and SCC AS (service centralization and continuity application server) in order to establish an IMS media connection path. After the single radio voice call continuity occurs in the media connection path through the ALG and the UE-1, the UE-1 and the network enable the UE-1 to establish a media connection using the CS domain and maintain the original session continuity process.

According to a standard single radio voice call terminal switching process, an access network decides to cause the UE-1 to switch from the PS domain to the CS domain, an eMSC prepares CS resources for the UE-1, which switches to the CS domain according to a network notification, where the process of keeping a single radio voice call continuity session alive comprises the following steps.

In step 101, a PS network entity, which is a mobility management entity (MME) or a serving GPRS support node (SGSN), sends a request of switching of the UE-1 from the PS domain to the CS domain to the eMSC.

In step 102, after the eMSC receives the request of switching of the UE-1 from the PS domain to the CS domain, it sends a transfer request destining for a number or identifier of the ALG to the ALG. The transfer request might be an INVITE message or an IAM (initialized address message).

In step 103, the ALG receives the transfer request and updates a media connection between the UE-1 and the ALG, that is, establishes a CS media connection between the UE-1 and the ALG.

In step 104, the ALG sends a response message of the transfer request, such as a "200 OK" message or an ANM (Answer Message), to the eMSC. Up to now, the ALG establishes a new signaling connection 4 with the eMSC.

During the switching from the PS domain to the CS domain, a CS signaling connection is also established between the UE-1 and eMSC.

Until now, a CS media connection is established between the eMSC and the UE-1 through the standard single radio voice call switching process, and a new media connection 3 is established through the single radio voice call continuity process. The eMSC connects the CS media connection with the newly established media connection 3, and the ALG connects the newly established media connection 3 with the original IMS media connection 2, such that the UE-1 can continue the call with the UE-2.

The existing method for implementing single radio voice call continuity does not consider an IMS re-registration timer in the S-CSCF. After the UE-1 switches to the CS domain, since the network does not provide a PS connection for the UE-1 to implement the IMS re-registration, the S-CSCF will release a session signaling path (that is, the signaling connection 2 in the FIG. 2) between the original SCC AS and the UE-1 due to re-registration timeout, such that the ALG receives a session release message in the IMS signaling connection 2, eventually resulting in interruption of the session.

SUMMARY OF THE INVENTION

The present invention provides a method and system for keeping a single radio voice call continuity session alive so as to solve the problem of call interruption due to a UE being unable to perform IMS re-registration in a destination domain in a single radio voice call continuity process in the prior art.

The present invention provides a method for keeping a single radio voice call continuity session alive comprising:

during switching of a terminal from a packet switch domain to a circuit switch domain, an application layer gateway establishing a new signaling connection with an enhanced mobile switch center after receiving a first transfer request and notifying a service centralization and continuity application server (SCC AS) to establish a new signaling connection with the application layer gateway, and the SCC AS establishing a new signaling connection with the application layer gateway according to the notification.

Preferably, the application layer gateway notifies the SCC AS to establish the new signaling connection with the application layer gateway by sending a second transfer request to the SCC AS.

Preferably, the first transfer request received by the application layer gateway is an invite message destining for a number or identifier of the application layer gateway, or an initialized address message destining for a number or identifier of the application layer gateway.

Preferably, the method further comprises:

the application layer gateway sending a response message of the first transfer request to the enhanced mobile switch center after establishing the new signaling connection with the enhanced mobile switch center; and the SCC AS sending a response message of the second transfer request to the application layer gateway after establishing the new signaling connection with the application layer gateway.

The response message of the first transfer request and the notification are sent simultaneously, or are sent after the response message of the second transfer request returned by the SCC AS is received.

Preferably, the second transfer request sent by the application layer gateway is an invite message destining for a number or identifier of the SCC AS, or an initialized address message destining for a number or identifier of the SCC AS.

The present invention also provides a system for keeping a single radio voice call continuity session alive comprising an application layer gateway, an enhanced mobile switch center and a service centralization and continuity application server (SCC AS); wherein the application layer gateway is configured to, during switching of a terminal from a packet switch domain to a circuit switch domain, establish a new signaling connection with an enhanced mobile switch center after receiving a first transfer request and notify a service centralization and continuity application server (SCC AS) to establish a new signaling connection with the application layer gateway.

The SCC AS is configured to establish a new signaling connection with the application layer gateway after receiving the notification.

Preferably, the application layer gateway is configured to notify the SCC AS to establish the new signaling connection with the application layer gateway by sending a second transfer request to the SCC AS.

Preferably, the first transfer request received by the application layer gateway is an invite message destining for a number or identifier of the application layer gateway, or an initialized address message destining for a number or identifier of the application layer gateway.

Preferably, the application layer gateway is further configured to send a response message of the first transfer request to the enhanced mobile switch center after establishing the new signaling connection with the enhanced mobile switch center.

The SCC AS is further configured to send a response message of the second transfer request to the application layer gateway after establishing the new signaling connection with the application layer gateway.

The response message of the first transfer request and the notification are sent simultaneously, or are sent after the response message of the second transfer request returned by the SCC AS is received.

Preferably, the second transfer request sent by the application layer gateway is an invite message destining for a number or identifier of the SCC AS, or an initialized address message destining for a number or identifier of the SCC AS.

The present invention provides a method and system for keeping a single radio voice call continuity session alive in which when single radio voice call switching of a terminal from a PS domain to a CS domain occurs, an eMSC sends a transfer request to an ALG in a session signaling path in which the terminal is located, and the ALG receives the transfer request and sends an IMS transfer request to the SCC AS to notify the SCC AS to establish a new IMS signaling connection with the ALG, and responds to the transfer request (that is, establishes a new IMS signaling connection with the eMSC). Because a new session signaling path between the SCC AS and the ALG is established through the IMS transfer request, the problem of call interruption due to re-registration timeout in the existing single radio voice call continuity process is solved.

PREFERRED EMBODIMENTS OF THE PRESENT INVENTION

Figure 1:
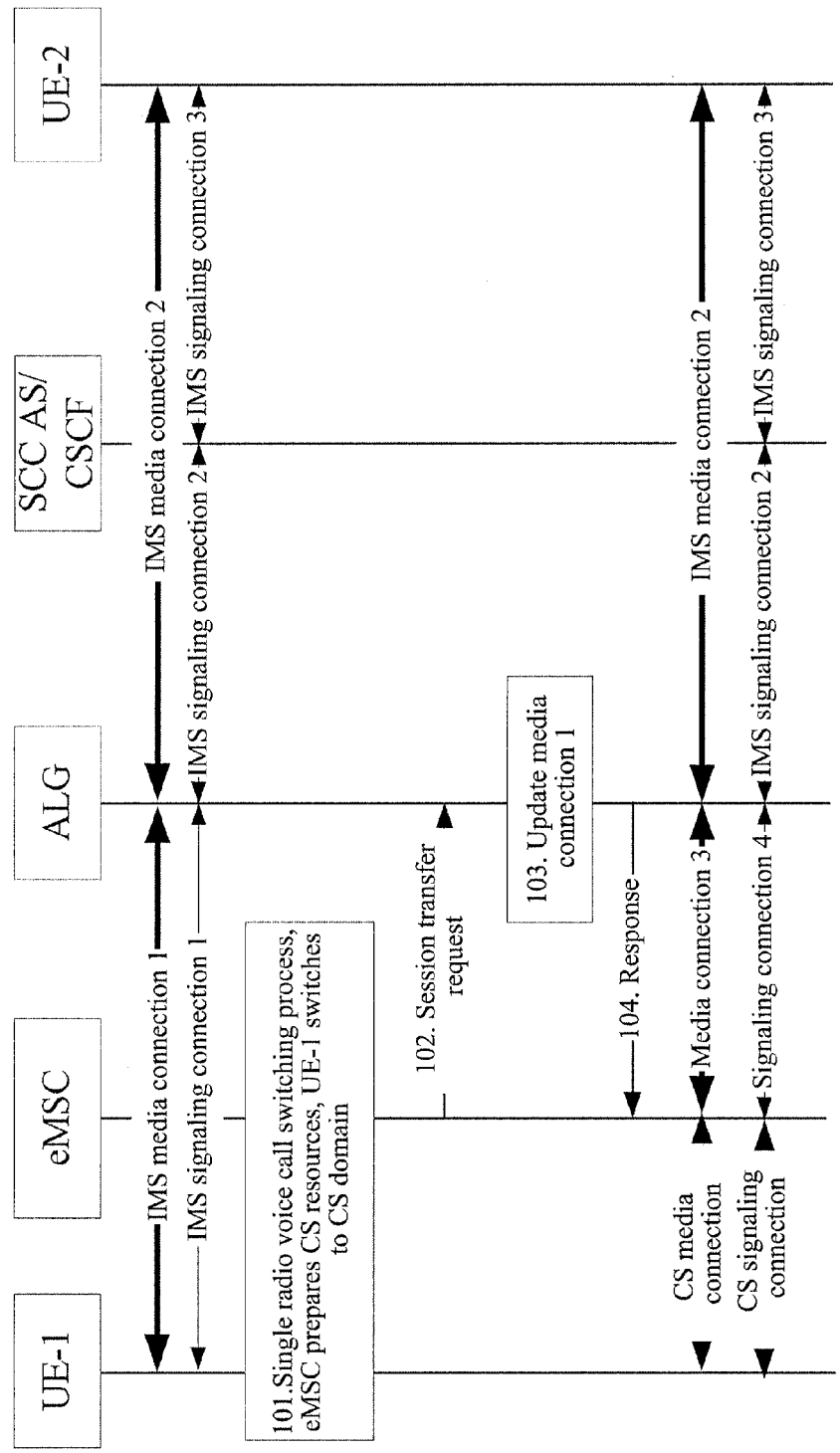
FIG. 1 is a flow chart of a existing method for implementing single radio voice call continuity.

The existing method for implementing single radio voice call continuity does not consider an IMS re-registration timer in the S-CSCF. After the UE-1 switches to the CS domain, since the network does not provide a PS connection for the UE-1 to implement the IMS re-registration, the S-CSCF will release a session signaling path between the original SCC AS and the UE-1 due to re-registration timeout, such that the ALG receives a session release message in the original session, eventually resulting in interruption of the session.

One embodiment provides a system for implementing single radio voice call continuity in an IP multimedia subsystem comprising a SCC AS, the ALG and an eMSC.

The ALG is configured to, during switching of a terminal from a packet switch domain to a circuit switch domain, establish a new signaling connection with an enhanced mobile switch center after receiving a first transfer request and notify a service centralization and continuity application server (SCC AS) to establish a new signaling connection with the application layer gateway.

The SCC AS is configured to establish a new signaling connection with the application layer gateway after receiving the notification.

The ALG is configured to notify the SCC AS to establish the new signaling connection with the application layer gateway by sending a second transfer request to the SCC AS.

The transfer request received by the ALG is an invite message destining for a number or identifier of the ALG, or an initialized address message destining for a number or identifier of the ALG.

The transfer request received by the ALG is denoted as the first transfer request, and the transfer request sent by the ALG to the SCC AS is denoted as the second transfer request.

The ALG is further configured to send a response message of the first transfer request to the enhanced mobile switch center after establishing the new signaling connection with the eMSC.

The SCC AS is further configured to send a response message of the second transfer request to the application layer gateway after establishing the new signaling connection with the ALG.

The response message of the first transfer request and the notification are sent simultaneously, or are sent after the response message of the second transfer request returned by the SCC AS is received.

The second transfer request sent by the ALG is an invite message destining for a number or identifier of the SCC AS, or an initialized address message destining for a number or identifier of the SCC AS.

The present invention provides a method for keeping a single radio voice call continuity session alive in an IP multimedia subsystem, in which during switching of a terminal from a packet switch domain to a circuit switch domain, an application layer gateway establishes a new signaling connection with an enhanced mobile switch center after receiving a first transfer request, and notifies a service centralization and continuity application server (SCC AS) to establish a new signaling connection with the application layer gateway, and the SCC AS establishes a new signaling connection with the application layer gateway according to the notification.

The First Embodiment

Figure 2:
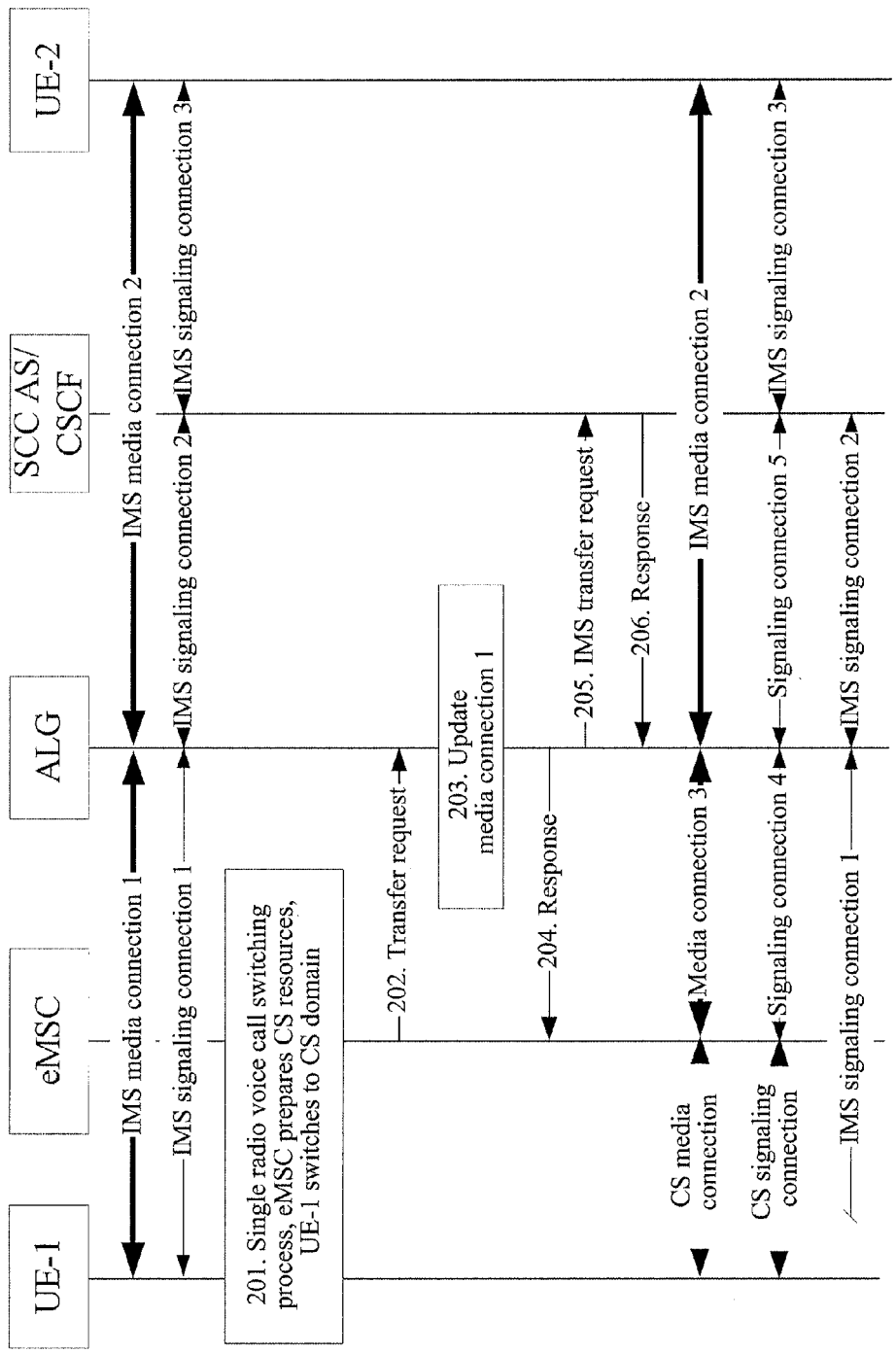
FIG. 2 is a flow chart of a method for implementing single radio voice call continuity in accordance with the first embodiment of the present invention.

FIG. 2 is the first flow chart of a method for implementing single radio voice call continuity in accordance with the present invention, in which an IMS session between a UE-1 and a UE-2 is established, session signaling passes through an ALG and SCC AS in order to establish an IMS media connection path, which passes through the ALG. During establishment of the session, the SCC AS sends a number of the SCC AS to the ALG through a signaling message. After single radio voice call continuity occurs in the UE-1, the UE-1 and the network enable the UE-1 to establish a media connection using the CS domain and maintain the original session continuity. The process comprises the following steps.

According to a standard single radio voice call terminal switching process, an access network decides to cause the UE-1 to switch from the PS domain to the CS domain, and an eMSC prepares CS resources for the UE-1, which switches to the CS domain according to a network notification, where the process of keeping a single radio voice call continuity session alive comprises the following steps.

In step 201, a PS network entity (MME or SGSN) sends a request of switching of the UE-1 from the PS domain to the CS domain to the eMSC.

In step 202, after the eMSC receives the request of switching of the UE-1 from the PS domain to the CS domain, it sends a transfer request to the ALG. The transfer request might be an INVITE message destining for a number or identifier of the ALG, which means a field indicating that the receiving end is the ALG is carried in the INVITE message, where the field contains the number or identifier of the ALG, or the transfer request might be an IAM (initialized address message) destining for a number or identifier of the ALG, which means a field indicating that the receiving end is the ALG is carried in the IAM, where the field contains the number of the ALG.

In step 203, the ALG receives the transfer request and updates a media connection between the UE-1 and the ALG, that is, establishes a CS media connection between the UE-1 and the ALG.

In step 204, the ALG sends a response message of the transfer request, such as a "200 OK" message or an ANM (Answer Message), to the eMSC. Up to now, the ALG establishes a new signaling connection 4 with the eMSC.

In step 205, at the same time as step 204, the ALG notifies the SCC AS to establish a new signaling connection with the ALG, such as send a transfer request to the SCC AS. The transfer request might be an INVITE message destining for a number or identifier of the SCC AS, which means a field indicating that the receiving end is the SCC AS is carried in the INVITE message, where the field containing the number or identifier of the SCC AS, or the transfer request might be an IAM destining for a number or identifier of the SCC AS, which means a field indicating that the receiving end is the SCC AS is carried in the IAM, where the field contains the number of the SCC AS. The number or identifier of the SCC AS is obtained through signaling interaction in the session establishment process.

In step 206, the SCC AS receives the transfer request, and returns a response message of the transfer request immediately, and establishes a new signaling connection 5 with the ALG. The returned response might be a "200 OK" message or an ANM (answer message).

During the switching from the PS domain to the CS domain, a CS signaling connection is also established between the UE-1 and the eMSC.

The SCC AS connects the newly established signaling connection 5 with the original IMS signaling connection 3, the ALG connects the newly established signaling connection 4 with the newly established signaling connection 5, and the eMSC connects the newly established signaling connection 4 with the newly established CS signaling connection.

Until now, a new signaling path is established between the ALG and the SCC AS. Since the UE-1 switches to the CS domain, one end of the original signaling path (that is, the IMS signaling connection 1) is actually in a half hang-up state, if the S-CSCF releases the original session signaling path (that is, the IMS signaling connection 2) due to re-registration timeout, the newly established session signaling path and the media connection will not be affected.

The Second Embodiment

Figure 3:
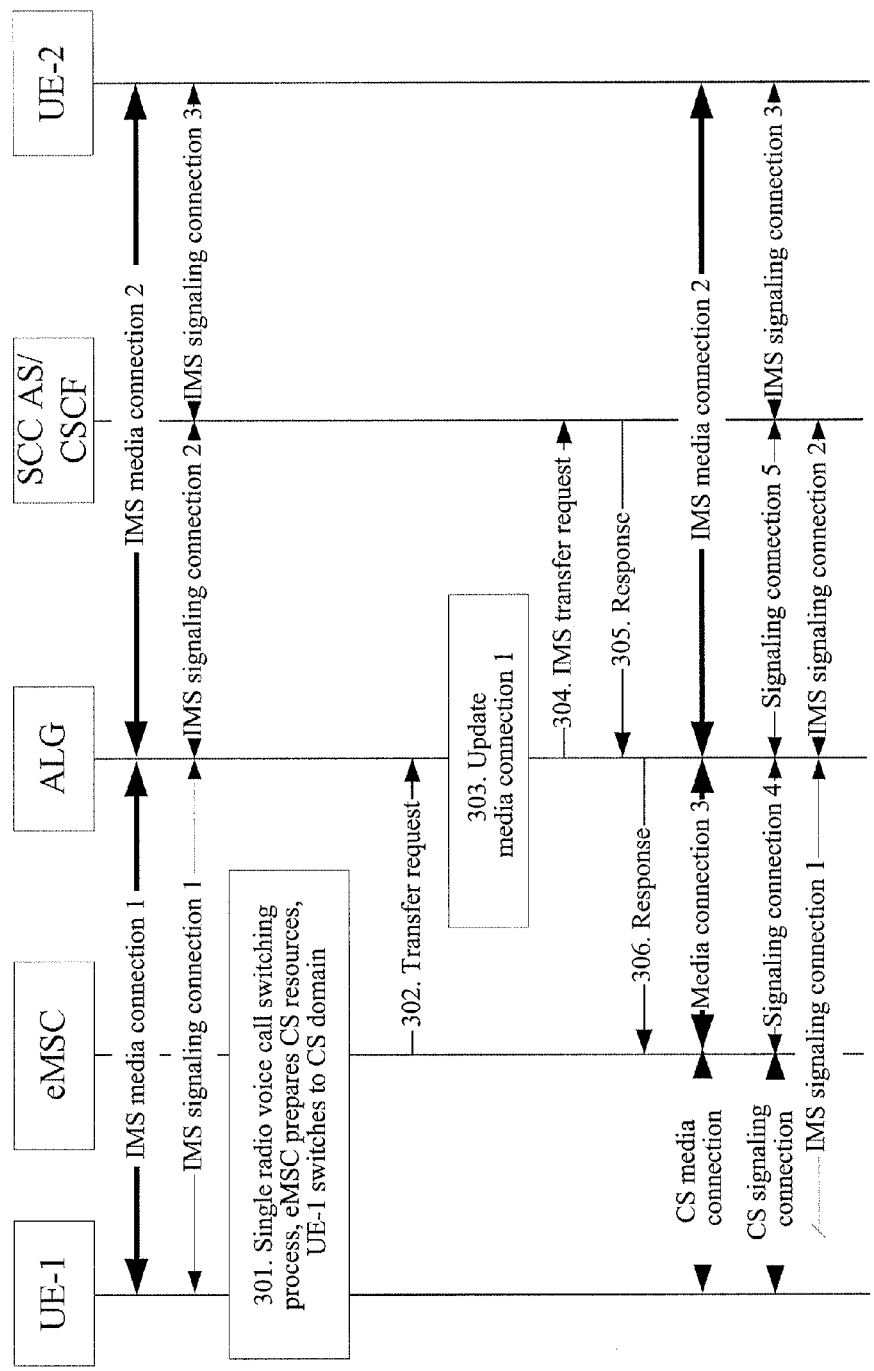
FIG. 3 is a flow chart of a method for implementing single radio voice call continuity in accordance with the second embodiment of the present invention.

FIG. 3 is the second flow chart of a method for implementing single radio voice call continuity in accordance with the present invention, in which an IMS session between a UE-1 and a UE-2 is established, session signaling passes through an ALG and SCC AS in order to establish an IMS media connection path, which passes through the ALG. During establishment of the session, the SCC AS sends a number of the SCC AS to the ALG through a signaling message. After single radio voice call continuity occurs in the UE-1, the UE-1 and the network enable the UE-1 to establish a media connection using the CS domain and maintain the original session continuity. The process comprises the following steps.

According to a standard single radio voice call terminal switching process, an access network decides to cause the UE-1 to switch from the PS domain to the CS domain, and an eMSC prepares CS resources for the UE-1, which switches to the CS domain according to a network notification, where the process of keeping a single radio voice call continuity session alive comprises the following steps.

In step 301, a PS network entity (MME or SGSN) sends a request of switching of the UE-1 from the PS domain to the CS domain to the eMSC.

In step 302, after the eMSC receives the request of switching of the UE-1 from the PS domain to the CS domain, it sends a transfer request to the ALG. The transfer request might be an INVITE message destining for a number or identifier of the ALG, which means a field indicating that the receiving end is the ALG is carried in the INVITE message, where the field contains the number or identifier of the ALG, or the transfer request might be an IAM (initialized address message) destining for a number or identifier of the ALG, which means a field indicating that the receiving end is the ALG is carried in the IAM, where the field contains the number of the ALG.

In step 303, the ALG receives the transfer request and updates a media connection between the UE-1 and the ALG, that is, establishes a CS media connection between the UE-1 and the ALG.

In step 304, after the ALG receives the transfer request, it notifies the SCC AS to establish a new signaling connection with the ALG, such as send a transfer request to the SCC AS. The transfer request might be an INVITE message destining for a number or identifier of the SCC AS, which means a field indicating that the receiving end is the SCC AS is carried in the INVITE message, where the field contains the number or identifier of the SCC AS, or the transfer request might be an IAM destining for a number or identifier of the SCC AS, which means a field indicating that the receiving end is the SCC AS is carried in the IAM, where the field contains the number of the SCC AS. The number or identifier of the SCC AS is obtained through signaling interaction in the session establishment process.

In step 305, the SCC AS receives the transfer request, and returns a response message of the transfer request immediately, and establishes a new signaling connection 5 with the ALG. The returned response might be a "200 OK" message or an ANM (answer message).

In step 306, the ALG receives the response message and then returns a response message of the transfer request to the eMSC immediately, and establishes a new signaling connection 4 with the eMSC, such as sends a "200 OK" message or an ANM.

During the switching from the PS domain to the CS domain, a CS signaling connection is also established between the UE-1 and the eMSC.

The SCC AS connects the newly established signaling connection 5 with the original IMS signaling connection 3, the ALG connects the newly established signaling connection 4 with the newly established signaling connection 5, and the eMSC connects the newly established signaling connection 4 with the newly established CS signaling connection.

Until now, a new signaling path is established between the ALG and the SCC AS. Since the UE-1 switches to the CS domain, one end of the original signaling path 1 is actually in a half hang-up state, if the S-CSCF releases the original session signaling path (that is, the IMS signaling connection 2) due to re-registration timeout, the newly established session signaling path and the media connection will not be affected.

It may be understood by those skilled in the art that all or some of steps contained in the described method embodiment can be implemented by related hardware instructed by programs which may be stored in a computer readable storage medium. The executed program comprises one of the steps of the method embodiment or a combination thereof.

In addition, each functional unit in each embodiment of the present invention can be implemented in the form of a hardware or software functional module. If the integrated module is implemented in the form of a software function module and sold or used as an independent product, it may also be stored in computer readable storage mediums.

The aforementioned storage medium may be a read-only memory, disk or CD-ROM. The above description is only the preferred embodiments of the present invention and the protect scope of the present invention is not limited thereto. Any variation or substitution occurring easily to those skilled in the art within the technical scope disclosed in the present invention should be covered in the protect scope of the present invention. Therefore, the protection scope of the present invention should be subject to the protection scope of the claims.

INDUSTRIAL APPLICABILITY

Compared with the prior art, in the method and system for keeping the single radio voice call continuity session alive, since the IMS transfer request establishes a new session signaling path between the SCC AS and the ALG, the problem of call interruption due to re-registration timeout in the existing single radio voice call continuity process is solved.

What is claimed is:

1. A method for keeping a single radio voice call continuity session alive comprising:
   during switching of a terminal from a packet switch domain to a circuit switch domain, an application layer gateway establishing a new signaling connection with an enhanced mobile switch center after receiving a first transfer request from the enhanced mobile switch center, sending a response message of the first transfer request to the enhanced mobile switch center after establishing the new signaling connection, and notifying, by the application layer gateway, a service centralization and continuity application server (SCC AS) to establish a new signaling connection with the application layer gateway, and the SCC AS establishing a new signaling connection besides an original signaling connection with the application layer gateway according to the notification from the application layer gateway.

2. The method according to claim 1, wherein the application layer gateway notifies the SCC AS to establish the new signaling connection with the application layer gateway by sending a second transfer request to the SCC AS.

3. The method according to claim 1, wherein the first transfer request received by the application layer gateway is an invite message destining for a number or identifier of the application layer gateway, or an initialized address message destining for a number or identifier of the application layer gateway.

4. The method according to claim 2, further comprising:
the SCC AS sending a response message of the second transfer request to the application layer gateway after establishing the new signaling connection with the application layer gateway; wherein
the response message of the first transfer request and the notification are sent simultaneously, or are sent after the response message of the second transfer request returned by the SCC AS is received.

5. The method according to claim 2, wherein the second transfer request sent by the application layer gateway is an invite message destining for a number or identifier of the SCC AS, or an initialized address message destining for a number or identifier of the SCC AS.

6. A system for keeping a single radio voice call continuity session alive comprising an application layer gateway, an enhanced mobile switch center and a service centralization and continuity application server (SCC AS); wherein
the application layer gateway is configured to, during switching of a terminal from a packet switch domain to a circuit switch domain, establish a new signaling connection with an enhanced mobile switch center after receiving a first transfer request from the enhanced mobile switch center, send a response message of the first transfer request to the enhanced mobile switch center after establishing the new signaling connection, and notify a service centralization and continuity application server (SCC AS) to establish a new signaling connection besides an original signaling connection with the application layer gateway; and
the SCC AS is configured to establish a new signaling connection with the application layer gateway after receiving the notification from the application layer gateway.

7. The system according to claim 6, wherein the application layer gateway is configured to notify the SCC AS to establish the new signaling connection with the application layer gateway by sending a second transfer request to the SCC AS.

8. The system according to claim 6, wherein the first transfer request received by the application layer gateway is an invite message destining for a number or identifier of the application layer gateway, or an initialized address message destining for a number or identifier of the application layer gateway.

9. The system according to claim 7, wherein the SCC AS is further configured to send a response message of the second transfer request to the application layer gateway after establishing the new signaling connection with the application layer gateway; and wherein
the response message of the first transfer request and the notification are sent simultaneously, or are sent after the response message of the second transfer request returned by the SCC AS is received.

10. The system according to claim 7, wherein the second transfer request sent by the application layer gateway is an invite message destining for a number or identifier of the SCC AS, or an initialized address message destining for a number or identifier of the SCC AS.

* * * * *